United States Patent [19]
Mills

[11] Patent Number: 5,347,750
[45] Date of Patent: Sep. 20, 1994

[54] PLANT PROTECTOR APPARATUS AND METHOD

[76] Inventor: Thomas Mills, 445 Lourdes La., Lafayette, Ind. 47906

[21] Appl. No.: 74,206

[22] Filed: Jun. 10, 1993

Related U.S. Application Data

[63] Continuation-in-part of Ser. No. 855,220, Mar. 20, 1992.

[51] Int. Cl.$^5$ ............................................. A01G 13/00
[52] U.S. Cl. ............................................. 47/30; 47/24
[58] Field of Search .................. 47/30, 30 OT, 26, 23, 47/24

[56] References Cited

U.S. PATENT DOCUMENTS

| | | |
|---|---|---|
| 645,518 | 3/1900 | Watt . |
| 1,299,870 | 4/1919 | Stevenson . |
| 1,875,533 | 9/1932 | Weaver . |
| 3,816,959 | 6/1974 | Nalle, Jr. ................................ 47/23 |
| 4,018,003 | 4/1977 | Mirecki . |
| 4,700,507 | 10/1987 | Allen ..................................... 47/23 |
| 4,899,486 | 2/1990 | Hurlstone ............................... 47/30 |
| 5,090,155 | 2/1992 | Rodgers ................................. 47/30 |

FOREIGN PATENT DOCUMENTS

| | | |
|---|---|---|
| 3621-614-A | 1/1988 | Fed. Rep. of Germany . |
| 15984 | of 1895 | United Kingdom . |
| 7424 | of 1907 | United Kingdom . |
| 2104366 | 3/1983 | United Kingdom ............ 47/30 OT |
| 2213033A | 3/1987 | United Kingdom . |

OTHER PUBLICATIONS

*The Progressive Farmer*, vol. 80, No. 2. Page 52 – Feb. 1965.

Primary Examiner—Henry E. Raduazo
Attorney, Agent, or Firm—Woodard, Emhardt, Naughton, Moriarty & McNett

[57] ABSTRACT

A reusable plant protector apparatus which can be anchored to the earth include A U5RU ,V:a flexible sheet having a top edge, a bottom edge, and two opposite side edges. The sheet defines a plurality of matching pairs of apertures which are offset from each of the side edges, so that the matching apertures in the opposite edges are aligned when the sheet is formed into a cylinder with a side edge overlap. The plant protector apparatus also includes a stake and a plurality of flexible ties extending through the apertures and around the stake for securing the overlapping side edges and the stake to each other. The ties are tightenable to tighten the stake against the overlapping edges thereby sealing the edges of the formed cylinder around the plant to be protected, thereby creating a sheltered climate of higher temperature and humidity around the plant. The plant protector apparatus may also be vented to adjust the temperature and humidity surrounding the plant. In one embodiment, the sheet is formed from a smooth inner layer and a corrugated outer layer, with the smooth layer extending beyond the outer layer at the top edge of the sheet. In another embodiment, ground engaging spikes are integrally formed in the flexible sheet at the bottom edge. A further embodiment is disclosed in which the sheet is extruded to define interlocking male and female fasteners along the opposite side edges to facilitate forming the sheet into a cylinder around the plant.

3 Claims, 12 Drawing Sheets

PLANT PROTECTOR APPARATUS AND METHOD

REFERENCE TO RELATED APPLICATIONS

This application is a continuation-in-part of pending application Ser. No. 07/855,220, filed on Mar. 20, 1992, also titled PLANT PROTECTOR APPARATUS AND METHOD.

BACKGROUND OF THE INVENTION

This invention relates generally to the field of plant protectors which are placed around a plant to provide protection and a favorable growing environment for plants, such as trees.

Plant protectors are used to protect young trees and other types of plants from foraging animals, such as rabbits, rodents and deer. They are also useful for retaining water vapor, thereby increasing the humidity near the plant to create a favorable sheltered growing climate inside the plant protector.

A plant protector may also raise the temperature of the sheltered climate around the plant, which is especially beneficial during colder spring months. Use of a plant protector may protect the plant from early spring cold spells, lengthen the growing season and increase the rate of growth. The increased growth may be beneficial to reforesting or orchard operations. Plant nurseries may also benefit from the increased plant growth which often occurs with the use of plant shelters. However, elevated temperatures in the sheltered climate may cause problems in the fall months by delaying when the plant goes dormant. Thus, the plant protector optimally is removed or is vented to lower the temperature surrounding the plant.

U.S. Pat. No. 4,899,486 to Hurlstone relates to a tree shelter having an elongated tubular body including a longitudinal channel or groove for receiving a stake and which is open at opposing ends. The device is formed of unperforated plastic material which allows light to pass therethrough. Hurlstone contemplates a continuous walled tubular body so that it lacks any capacity for enlarging the diameter of the tubular body. The Hurlstone device is further limited in application because of the inherent difficulty of placing a closed cylinder over plants having spreading branches.

Other types of plant protectors include U.S. Pat. No. 3,816,959 to Nalle which discloses a plant protector having tubular mesh to prevent plants from being damaged by animals. However, this particular device provides little favorable sheltered climate effect due its use of open tubular mesh which permits circulation of air therethrough.

U.S. Pat. No. 4,700,507 to Allen discloses a tree bark protector made from high impact polyurethane plastic molded into half sections which can be fitted over the base portion of a tree trunk where it widens into the soil. The Allen device includes ground engaging anchors for a bottom flange. The facing edges of the half sections accommodate molded locking connectors in enlarged or swollen portions.

U.S. Pat. No. 1,875,533 to Weaver discloses a tree protector formed from concrete which rests on the surface of the ground and surrounds the base of a tree. The disclosed apparatus includes three longitudinal solid sections of identical size and shape secured in assembled relation by wires.

SUMMARY OF THE INVENTION

One embodiment of the present invention is characterized by a resilient polymeric sheet having a top edge, a bottom edge, and two side edges. The two side edges further comprise a plurality or matching pairs of apertures which are offset from the side edges. The matching apertures are aligned such that an aperture on one side edge has a corresponding aperture on the other side edge when the sheet is formed into a cylinder. The offset of the apertures from the side edges permits a small overlap of the edges. The plant protector apparatus also includes a stake and a plurality of flexible ties which extend through the apertures and around the stake for securing the overlapping side edges and the stake to each other. The ties are tightenable to press the stake against the overlapping edges thereby sealing the edges and forming a flexible cylinder around the plant to be protected.

In another aspect of the invention, the plant protector apparatus comprises a polymeric sheet having a substantially smooth inner ply affixed to an outer corrugated ply having grooves that extend longitudinally along the sheet. A further feature of the present invention includes bendable flaps along the top edge of the smooth inner ply. The flaps are defined by a plurality of longitudinal slits located on a portion of the smooth ply that extends beyond the top edge of the corrugated layer.

One object of the present invention is to provide a reusable plant protector apparatus which may be easily and quickly placed around a plant to be protected. Another object of the present invention is to simplify installation of the plant protector by permitting attachment of the side edges and the stake together in one operation.

A further object of the present invention is to provide means for ventilating the plant protector, while another object of the invention is to provide a plant protector apparatus which is compact and economical to produce. A further object is to provide a plant protector which may be easily installed around a tree having spreading branches above the trunk area.

Other objects, and certain benefits, of the present invention will become apparent to those of ordinary skill in the art from the following written description and accompanying figures.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1–4, a plant protector apparatus 11 is illustrated which comprises a resilient polymeric sheet 13 having a top edge 15, a bottom edge 17, and two side edges 19 and 21. The apparatus also includes a number of apertures 22 and 23 defined in matching pairs at the opposite side edges 19 and 21, respectively. These matched apertures 22 and 23 can be aligned such that an aperture on one side edge 19 has a corresponding aperture on the other side edge 21 when the sheet 13 is formed into a cylinder 24. The apertures 19 and 21 are offset from their respective side edges so that the edges may overlap, as shown by side edge overlap 27 in FIG. 3.

Figure 1:
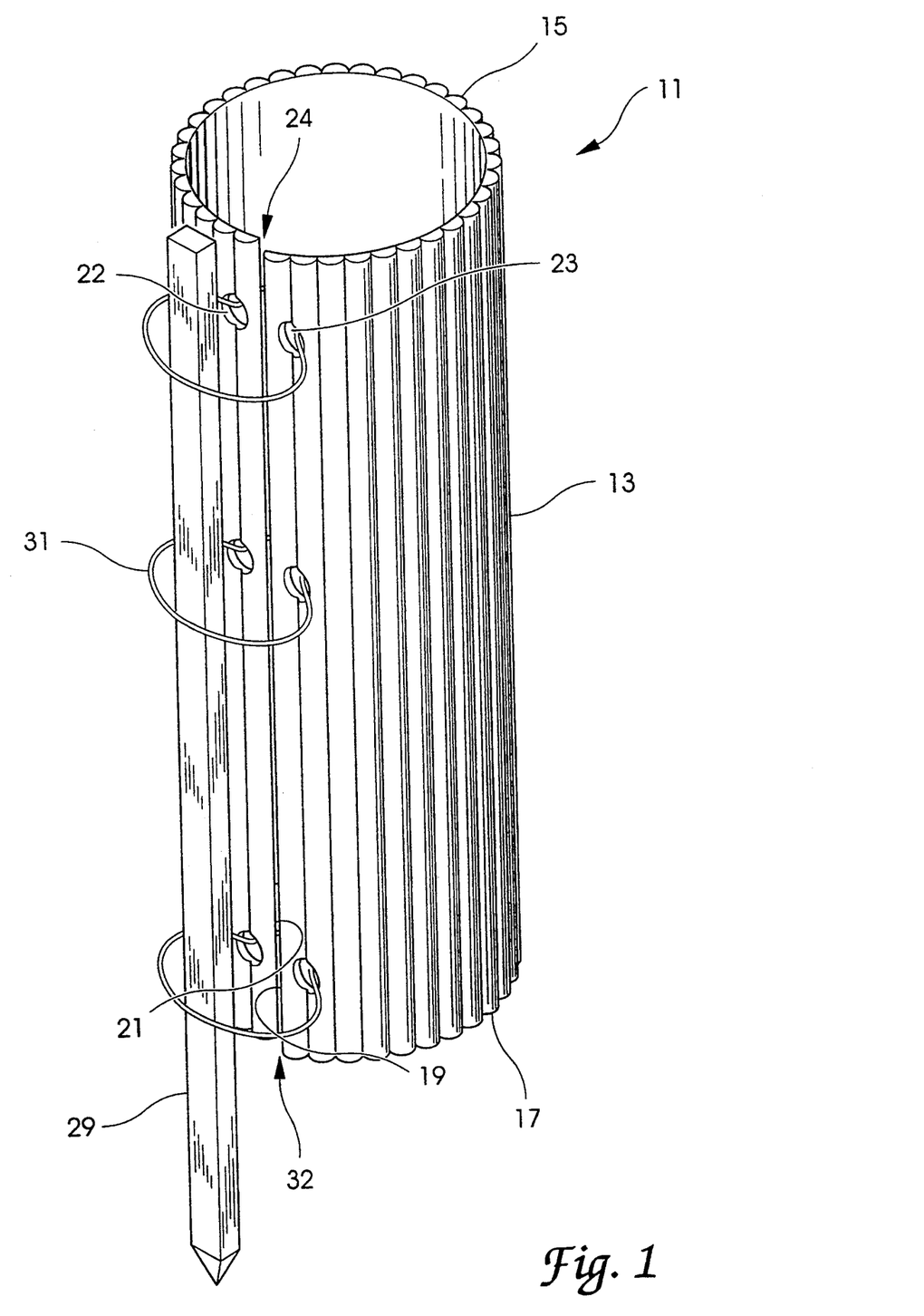
FIG. 1 is a side view of the plant protector apparatus having flexible ties engaged but not tightened about a support stake, thus illustrating the relationship of the side edges, the apertures, the ties and the stake prior to tightening the flexible ties.
Figure 2:
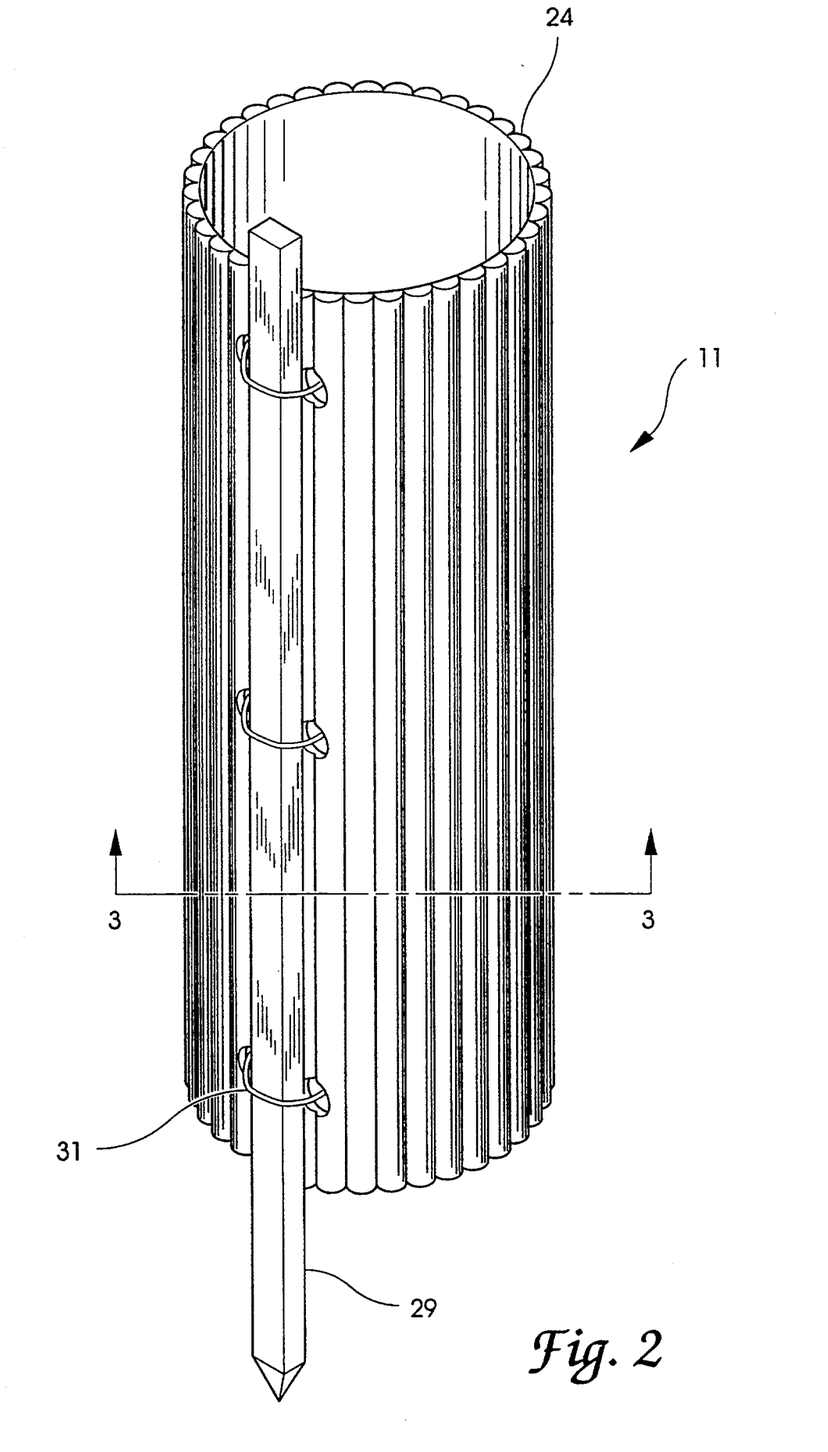
FIG. 2 is a side view of the apparatus in FIG. 1 with the ties tightened about the stake.
Figure 3:
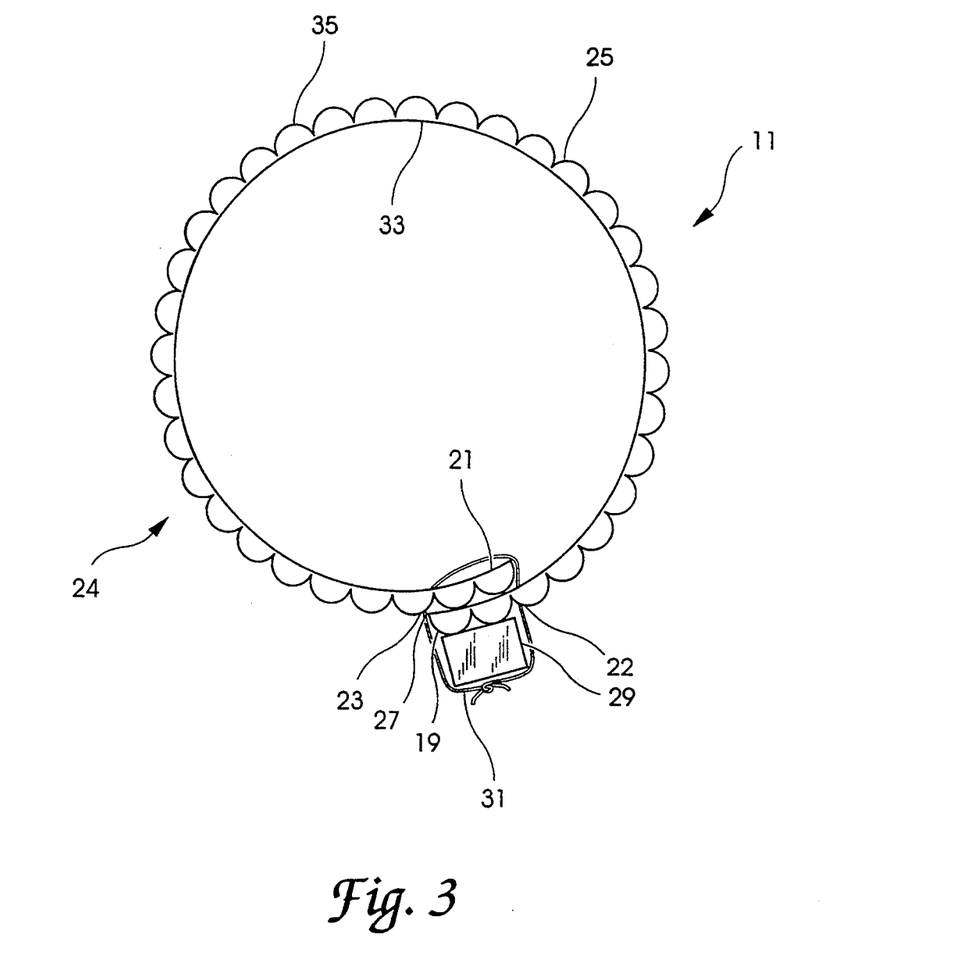
FIG. 3 is a cross-sectional view of the apparatus in FIG. 2 showing the overlapping side edges tightened against the stake and showing the inner substantially smooth layer and the outer corrugated layer.

The apparatus also includes a stake 29 for anchoring the apparatus to the ground. A number of flexible ties 31 extend through the matching apertures 22 and 23 and around the stake 29 to secure the side edges 19, 21 and stake 29 to one another. The ties 31 are tightenable to force the side edges into overlapping relation and to press the stake 29 against the overlap 27, thereby sealing the edges and forming a cylinder 24 around the plant to be protected. A preferred side edge overlap is about one inch, which requires a stake 29 having a comparable width.

FIG. 1 illustrates the flexible ties 31 passing through the matching apertures 22 and 23 and around the stake 29 but not yet tightened. FIGS. 2 and 3 illustrate the normal operating position of the apparatus in which the flexible ties 31 are tightened to secure the edges and stake together thereby forming a seal along the overlap 27. The ties 31 can be of the type such that the ends can be twisted together, such as ends 32, to tighten the ties about the stake.

Figure 4:
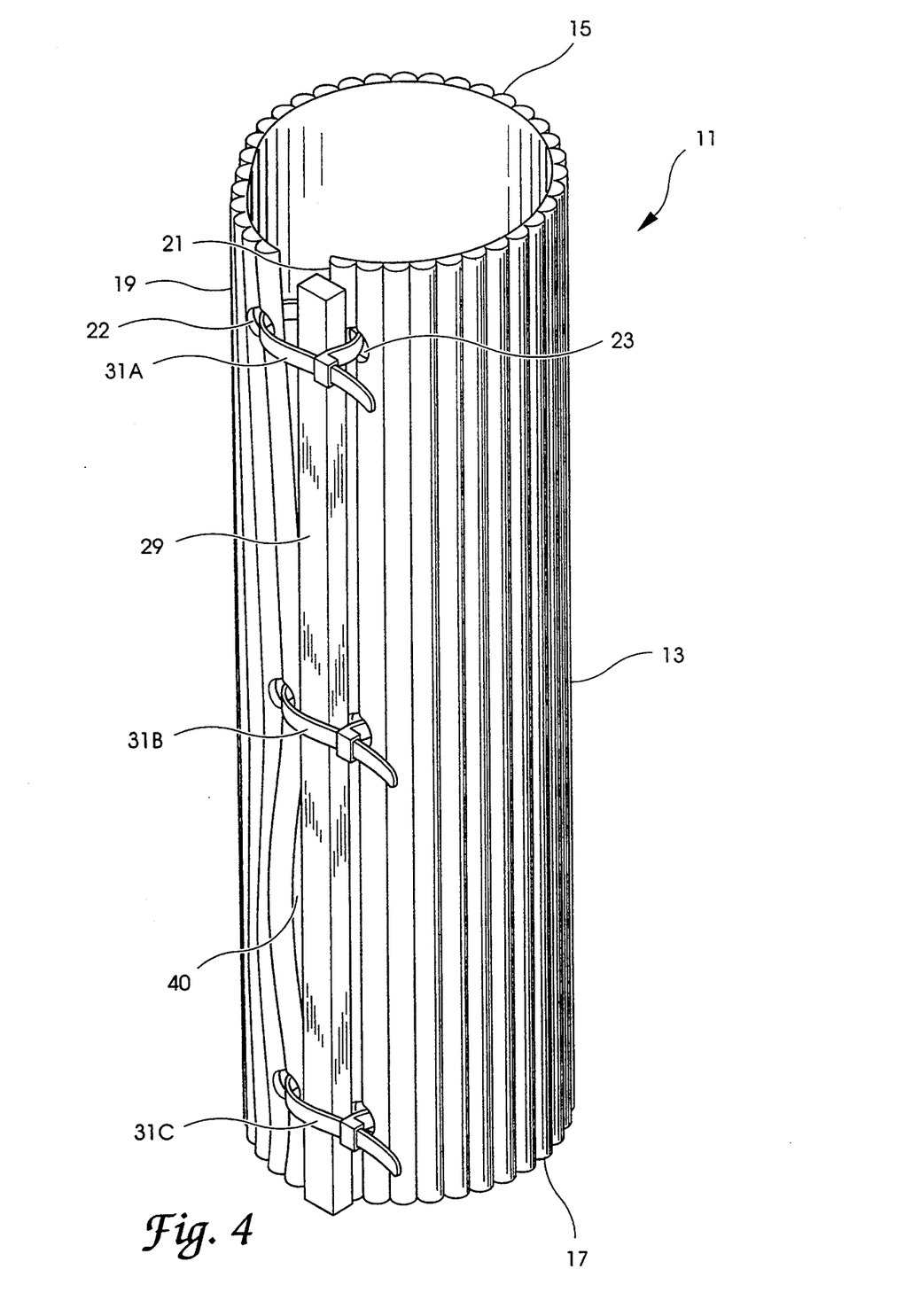
FIG. 4 illustrates a side view of the apparatus in FIG. 1 having a "window" formed.

FIG. 4 illustrates apparatus 11 having a "window" 40 which includes all of the features described in FIGS. 1–3. In this embodiment, the ties 31 can be of a known flexible interlocking type, such as an electrical cable tie. The plant protector apparatus 11 is shown with three ties, 31A, 31B and 31C which can define a "window" 40 while maintaining a rigid connection to the stake. This is accomplished by loosening the top tie 31A and middle tie 31B, pulling the side edge 19 over the stake 29. The bottom tie 31C is left tight leaving a portion of the side edge 19 near the bottom edge 17 located adjacent to the side edge 21 while the remaining portion of the outer overlapping edge is positioned adjacent to the stake 29 so that the stake is between both side edges 19 and 21 above the lower tie 31C and tightening the top tie. An alternative method for venting the plant protector apparatus 11 includes loosening the middle tie 31B, separating side edge 19 from side edge 21 and inserting a wedge or stake between the side edges thereby maintaining a ventilation opening.

Preferred materials for the resilient sheet 13 include polyethylene and polypropylene, although alternative polymers may be used. It is also contemplated that bubble pack sheet material, single layer sheets, polymeric foams and sheets of treated cellulose or other similar materials can be used as long as they are flexible and are substantially resistant to decay from the elements. It is contemplated that the polymeric sheets permit passage of light there through, although alternative embodiments may include opaque polymeric sheets and the use of color to absorb or reflect certain frequencies of light to modify the heat generated. The plant protector can also be composed of a biodegradable material that does not require removal after use.

An especially preferred material for the sheet 13 is a multiple ply resilient polymeric sheet which includes a substantially smooth inner ply or layer 33 and corrugated outer ply 35, as shown in FIG. 3. It is contemplated that the material of both sheets be of sufficient gauge to weigh about 90 to 150 pounds per thousand square feet, the preferred weight of material being 130 pounds per thousand square feet. A variety of corrugation patterns and sheet gauges may be used to vary structural characteristics and resiliency of the sheet 13 for the desired application. The two layers 33 and 35 are preferably bonded together. The corrugated ply 35 includes grooves 36 that extend longitudinally along the sheet. One advantage of lamination of corrugated outer layer 35 and smooth inner layer 33 is realized in an increase in strength and rigidity of the assembled apparatus 11. The substantially smooth inner layer 33 also helps protect the plant from damage by chaffing.

The flexible ties 31 may be locking nylon ties, metal wire, rope or cloth ties. Adhesive tape may also be used to seal and adhere the side edges to one another. It is also contemplated that the side edges 19 and 21 can be heat sealed together during manufacture or after placement around the plant. The stake 29 may be formed of wood, metal, plastic or other suitable materials for anchoring an apparatus to the ground. Although a single stake is generally used, larger cylinders or protectors placed in areas of higher winds may use multiple stakes for added security. It is preferred that multiple stakes be secured by ties passing through matching apertures at other locations around the circumference of the apparatus 11.

Advantages of the plant protector include being able to open the side edges to allow ventilation to permit the plant to become dormant in the fall and to prevent overheating in warm climates. The plant protector apparatus allows the venting of the air around the plant by loosening the flexible ties and separating the side edges. This allows air to mix and pass through the tree protector to lower the temperature and humidity in a manner similar to how a greenhouse is ventilated.

The use of a flexible sheet offers significant advantages over a sealed or continuous cylinder. Many plants or trees to be protected have spreading branches which make placement of a continuous cylinder around the plant more difficult. This problem is avoided by the present apparatus and method which contemplates wrapping the sheet 13 around the plant and connecting the opposite edges of the sheet to form a cylinder.

Another advantage of the plant protector of this invention is the ability to supply the protector in sheet form. The sheets may be supplied in large rolls or as precut sheets placed in packing boxes to allow better use of shipping space. The use of a sheet permits economical manufacture of the plant protector in a wide variety or diameters and heights to satisfy a variety of applications.

In using the plant protector 11, the sheet is formed around a plant and the side edges 19 and 21 are overlapped to define a cylinder. The user next aligns the matching apertures 22 and 23 along the side edges, and places the stake 29 at the overlap 27. Ties 31 are passed through the apertures and around the stake and tightened to seal the edges. The stake can be anchored into the ground before or after the ties have been engaged around the stake. The user may also slip the ties over the stake after the ties have been loosely engaged through the apertures.

The stability of the plant protector may also be increased by inserting a portion of the bottom edge 17 into the earth to reduce lateral twisting and turning caused by wind. The insertion of the bottom edge into the ground for increased stability is especially effective when using a sheet having a corrugated outer layer 35. Insertion of the plant protector into the ground also forms a seal between the bottom edge and the ground which increases the sheltered climate effect by reducing ventilation of the tree protector.

Figure 5:
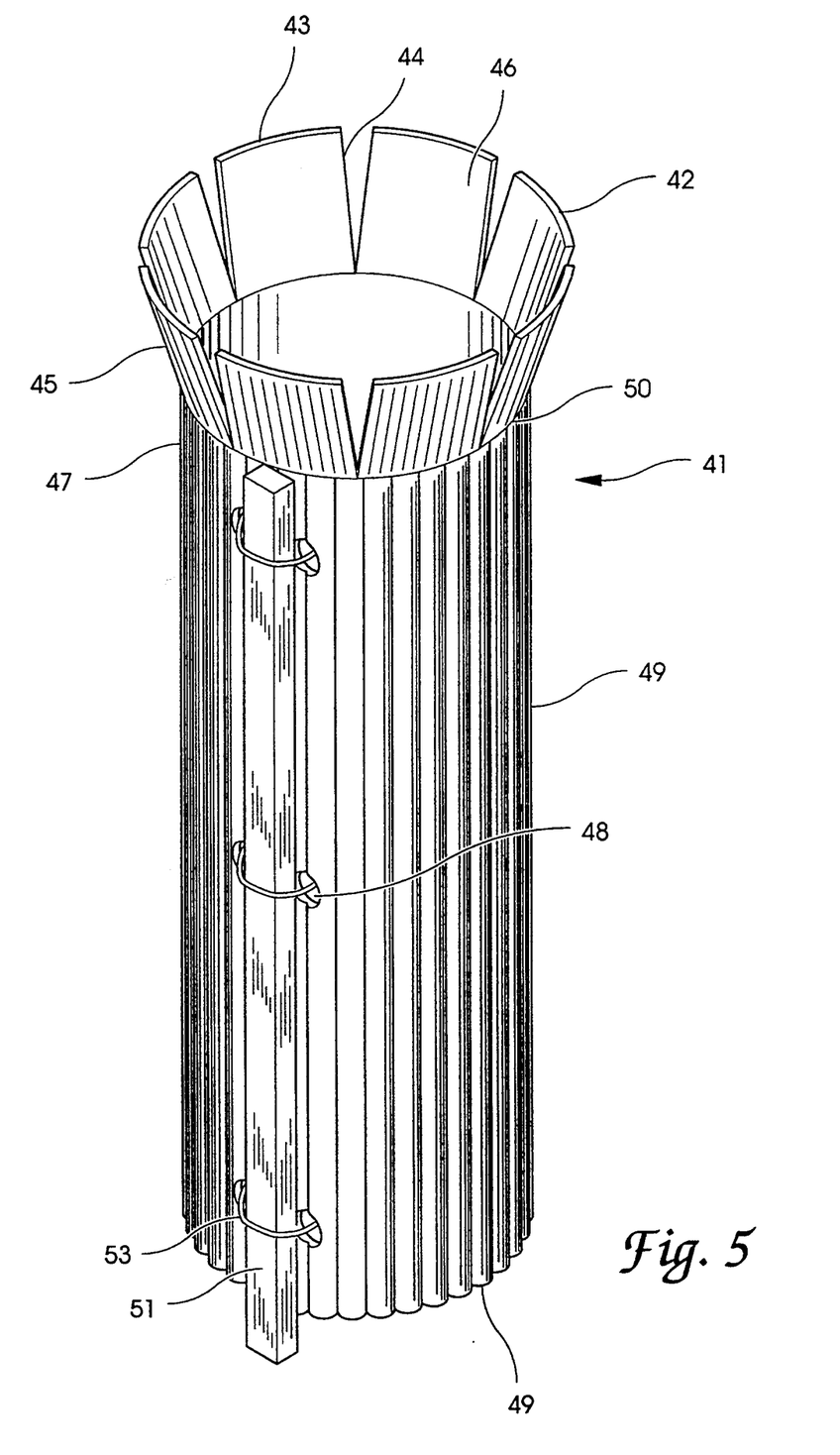
FIG. 5 illustrates an alternative embodiment of the plant protector that includes top flaps which can be bent outward of the top of the plant protector.

Referring now to FIG. 5, an alterative embodiment of the invention is shown in which a plant protector apparatus 41 includes the principal features of plant protector apparatus 11 and additionally includes top flaps 42 formed along top edge 43 of the inner layer 46. The flaps 42 are defined by a plurality of longitudinal slits 44 formed on a portion 45 of the inner layer 46 which extends beyond top edge 50 of the corrugated layer 47 to the top edge 43. Alternatively, the flaps may be cut into the corrugated layer 47 as well in the instance with no portion 45 extending beyond the corrugated layer. The top flaps 42 can be folded outward to accommodate branches near the top edge 43, and to decrease chaffing damage to the branches due to motion of the protector 41 resulting from the wind. It is preferred that the flaps be at least one or two inches long although they may be shorter in alternative embodiments. The top flaps may resiliently engage the tree branches between the flaps, further securing the upper portion of the plant protector.

Alternatively, the portion 45 of the inner layer 46 which extends beyond top edge 50 of the corrugated layer 47 can be folded outwardly over the corrugated layer or extend upward. In this embodiment the portion 45 is continuous between the side edges rather than having flaps 42 defined by longitudinal slits 44 as shown in FIG. 5. The unslit portion 45 in this embodiment has been effective in reducing chaffing damage due to its substantially smooth surface and resilient cushioning effect when in contact with plants. Details of this variation are described herein in connection with FIGS. 9–11.

Figure 6:
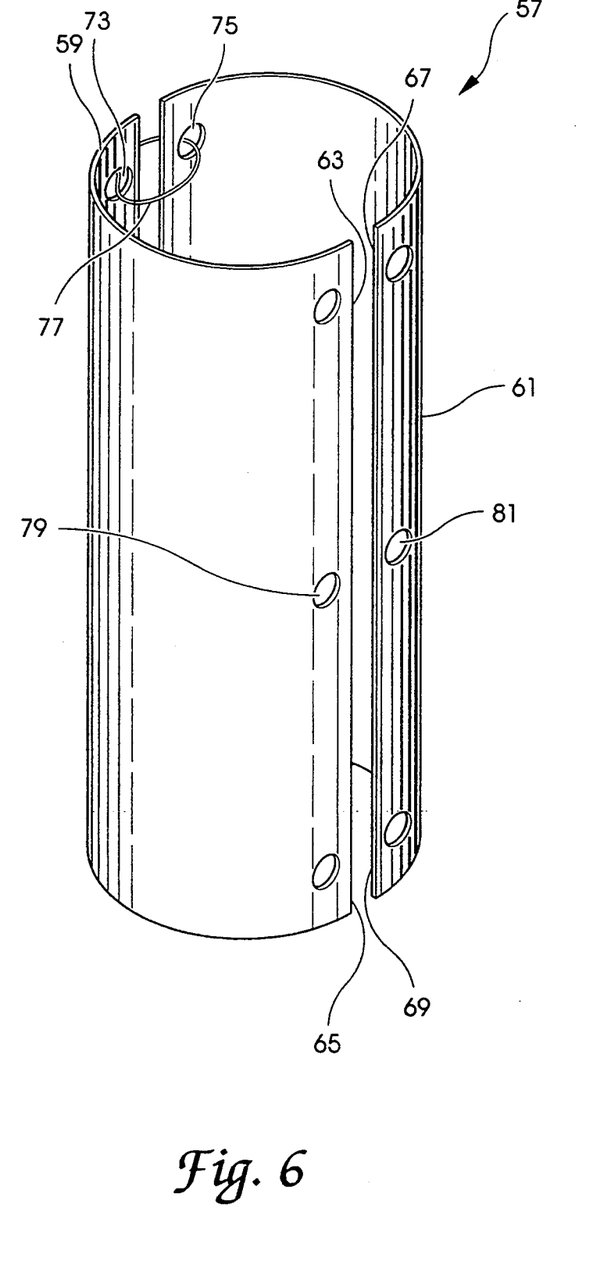
FIG. 6 is a side view showing two sheets connected to provide a larger diameter plant protector with flexible ties engaged through matching side edge apertures prior to tightening. For clarity, the plant protector is shown without the stake and the flexible ties for engaging the matching apertures on the opposite side edges of the sheets.

FIG. 6 illustrates a composite plant protector 57 formed by a first sheet 59 and a second sheet 61, each of which can be the configured like sheet 13 in FIG. 1. The first sheet 59 includes a first side edge 63, and a second side edge 65, while the second sheet also includes a first side edge 67 and a second side edge 69. The respective first side edges 63 and 67 each include a number of matching apertures 73 and 75 offset from the respective side edges. The apertures 73 and 75 can be aligned so that the first side edges of the two sheets 59 and 61 overlap. Flexible ties 77 passing through the apertures 73 and 75 can secure the sheets together at the first edges 63 and 67. The second side edges 65 and 69 of the first sheet 59 and second sheet 61, respectively, also include matching apertures 79 and 81. A number of flexible ties (not shown) can be passed through matching apertures 79 and 81 to encircle a stake (not shown) in a manner described above, thereby forming a larger diameter cylinder. It is apparent that a plurality of sheets, such as sheet 13 in FIG. 1, can be connected in the manner just described to form a composite plant protector, such as protector 57 in FIG. 5. The resulting cylinder is sealed at all overlapping side edges using flexible ties. Stakes, such as stake 29, can be attached at each of the side edge overlaps using the same ties 77.

Figure 7:
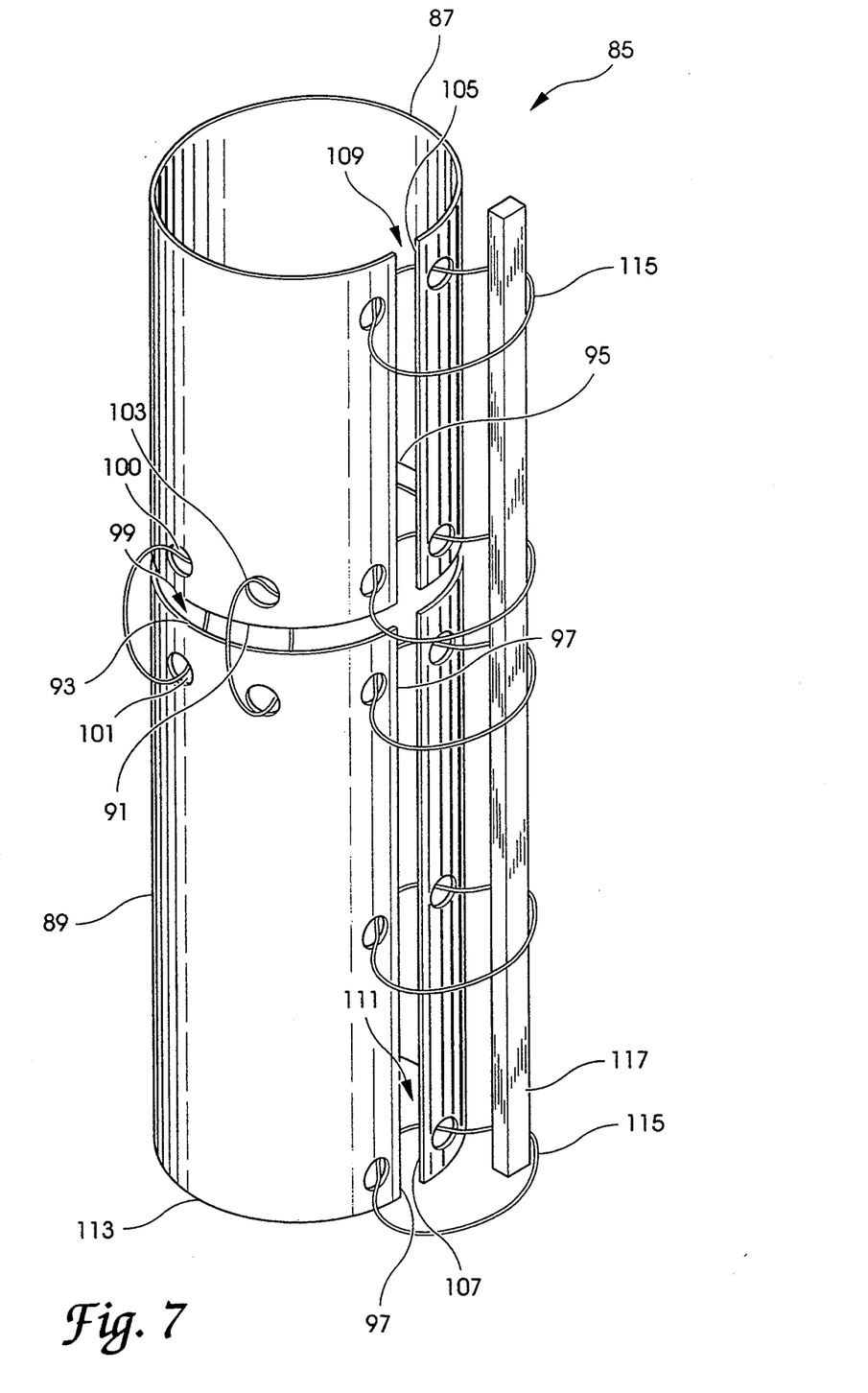
FIG. 7 is a side view of a plant protector apparatus having two sheets which are vertically connected to provide a taller protector apparatus.

FIG. 7 illustrates an alternative embodiment of a composite plant protector for taller plants. In this embodiment, a composite plant protector apparatus 85 includes a first sheet 87 and a second sheet 89, each of which include the features of the sheets shown in FIGS. 1–4. The first sheet 87 includes a bottom edge 91 which is situated adjacent top edge 93 of the second sheet 89. The edges 91 and 93 include a plurality of matching apertures 100 and 101, respectively, which are located a substantially equal distance from their respective edges 91 and 93. Flexible ties 103 passing through apertures 100 and 101 connect the bottom edge 91 of the first sheet 87 to the top edge 93 of the second sheet 87 thereby forming a taller cylinder.

Plant protector 85 also includes side edges 95 on the first sheet 87 and 105 on the first sheet 87 with matching pairs of apertures 109. The second sheet 89 includes side edges 97 and 107, also with matching pairs of apertures 111. A plurality of flexible ties 115 extending through the aperture pairs 109 and 111 can be used to engage the cylindrically formed sheets to a stake 117 in the manner described above. The stake 117 differs from the stakes previously described in that it is longer to support the taller cylinder formed by the composite plant protector 85 of FIG. 6.

It is also contemplated that the first sheet 87 and the second sheet 89 be sealed together without requiring matching apertures 100 and 101 and ties 103 passing there through by using adhesive tape at the respective bottom edge 91 and top edge 93. It is preferred to apply the adhesive tape to the inner portion of the sheets for protection from the elements prior to placement around the plant. Alternatively, the sheets may be joined by adhering the tape to the outer portion of the sheet. It is also contemplated that the sheets 87 and 89 may be joined by a heat seal. The heat seal may be formed prior to shipment to the user or on-site by the user.

Figure 8:
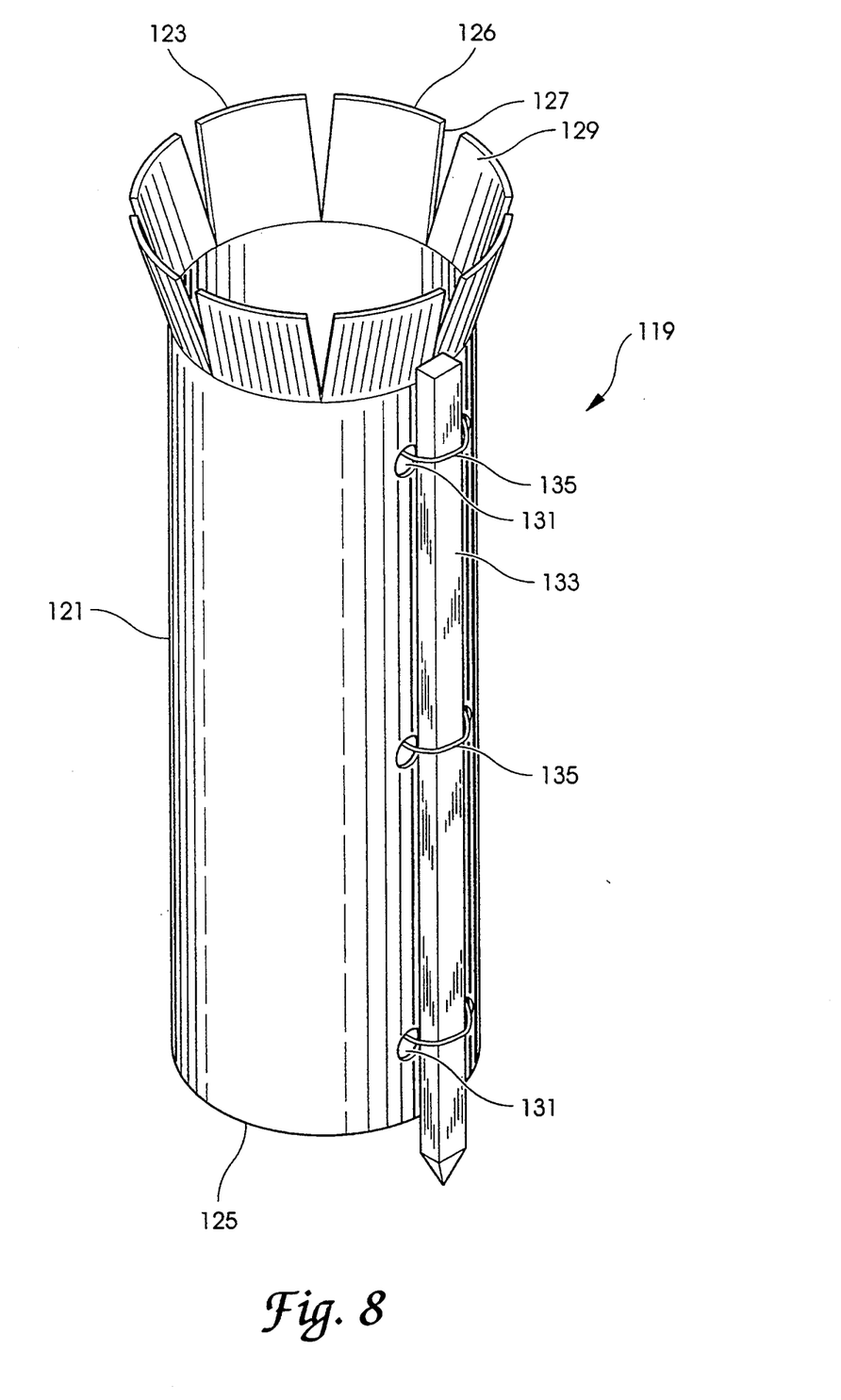
FIG. 8 is a side elevational view of an alternative embodiment of the plant protector apparatus having a tubular body.

Referring to FIG. 8, an alternative plant protector apparatus 119 is shown. The plant protector apparatus 119 comprises a resilient polymeric cylinder 121 having a top end 123 and a bottom end 125. The cylinder 121 includes a substantially continuous wall 126 which defines longitudinal slits 127 which define top flaps 129 located adjacent the top end 123. The cylinder also includes matching pairs of apertures 131 spaced at uniform distances from the bottom end 125. The plant protector apparatus 119 also includes a stake 133 and flexible ties 135 which pass through the matching apertures 131 and around the stake. The cylinder 121 in this embodiment is formed from a single face thermoplastic, cardboard or cellulosic material. It is preferred that a number of cylinders 121 be provided having slightly different diameters to permit nesting for more efficient shipment of the plant protectors. Alternatively a sheet 13 as shown in FIGS. 1-4 may have its side edges 19 and 21 heat sealed to one another to form the resilient polymeric cylinder 121.

The plant protector 119 is placed around the plant to be protected by sliding the cylinder 121 over the plant, sliding the flexible ties 135 through the matching apertures 131 and encircling the stake. 133 The ties 135 are tightened and the plant protector is anchored by anchoring the stake and the bottom end into the ground. After the plant protector is anchored the top flaps are positioned by bending the top flaps outward from the plant.

Figure 9:
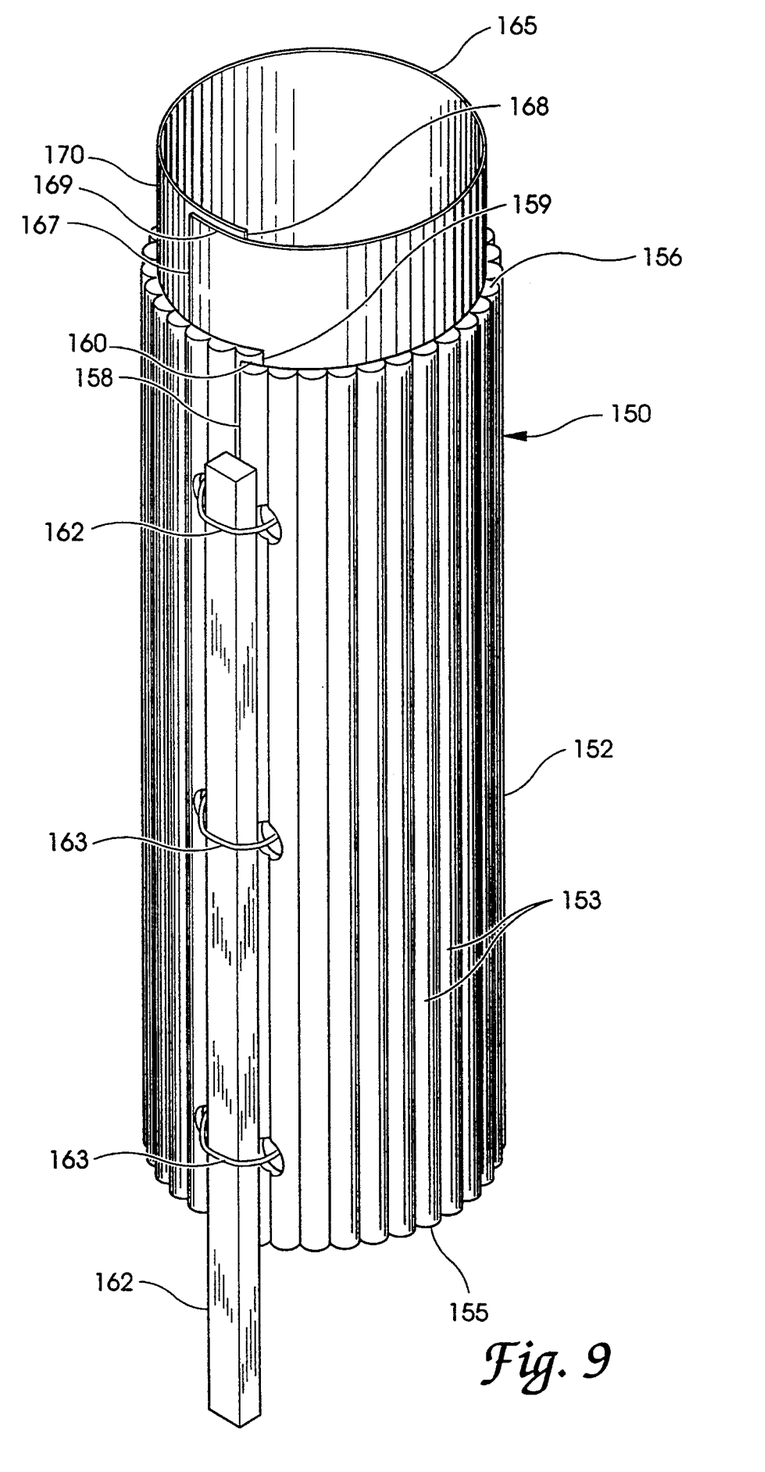
FIG. 9 is a side view of a further embodiment of the plant protector invention.

Referring now to FIG. 9, an alternative embodiment of the invention is depicted which parallels the embodiment shown in FIG. 5. Specifically, a plant protector apparatus 150 is formed by an outer sheet 152 which is corrugated to include a number of longitudinally extending grooves 153, in a manner previously described. The outer sheet 152 has a bottom edge 155, which will ultimately be disposed adjacent the ground, and an opposite top edge 156. The first side edge 158 and second side edge 159 are overlapped at a portion 160, in a manner previously described. A number of matching apertures are provided in each of the edges 158 and 159, substantially identical to the apertures 22 and 23 shown in FIG. 1. An anchor stake 162 is attached to the outer corrugated sheet 152 by a number of flexible ties 163, each extending through corresponding apertures in the outer sheet, in a manner previously described.

The plant protector 150 further includes an inner sheet 165, which in this instance is preferably separate from the outer sheet 152. The inner sheet includes a first and second side edges, 167 and 168 respectively, which join at an overlap 169. The overlap 169 corresponds to the overlap 160 for the outer sheet 152. The inner sheet also includes corresponding matching apertures which are aligned with the similar apertures in the outer sheet 152.

In this embodiment of the invention, the plant protector 150 includes an extended top portion 170 of the inner sheet 165. In one specific embodiment, the top sheet extends beyond the top edge 156 of the outer sheet 152 by one-half-one and one half inches. The inner sheet 165 is made of a thinner gauge material than the outer corrugated sheet 152 so that it is very flexible and resilient should it contact the plant to be protected. In this embodiment, the top portion 170 differs from the embodiment shown in FIG. 5 in that the top portion is continuous, rather than formed into a number of flaps, such as flaps 42 in that earlier embodiment.

Figure 10:
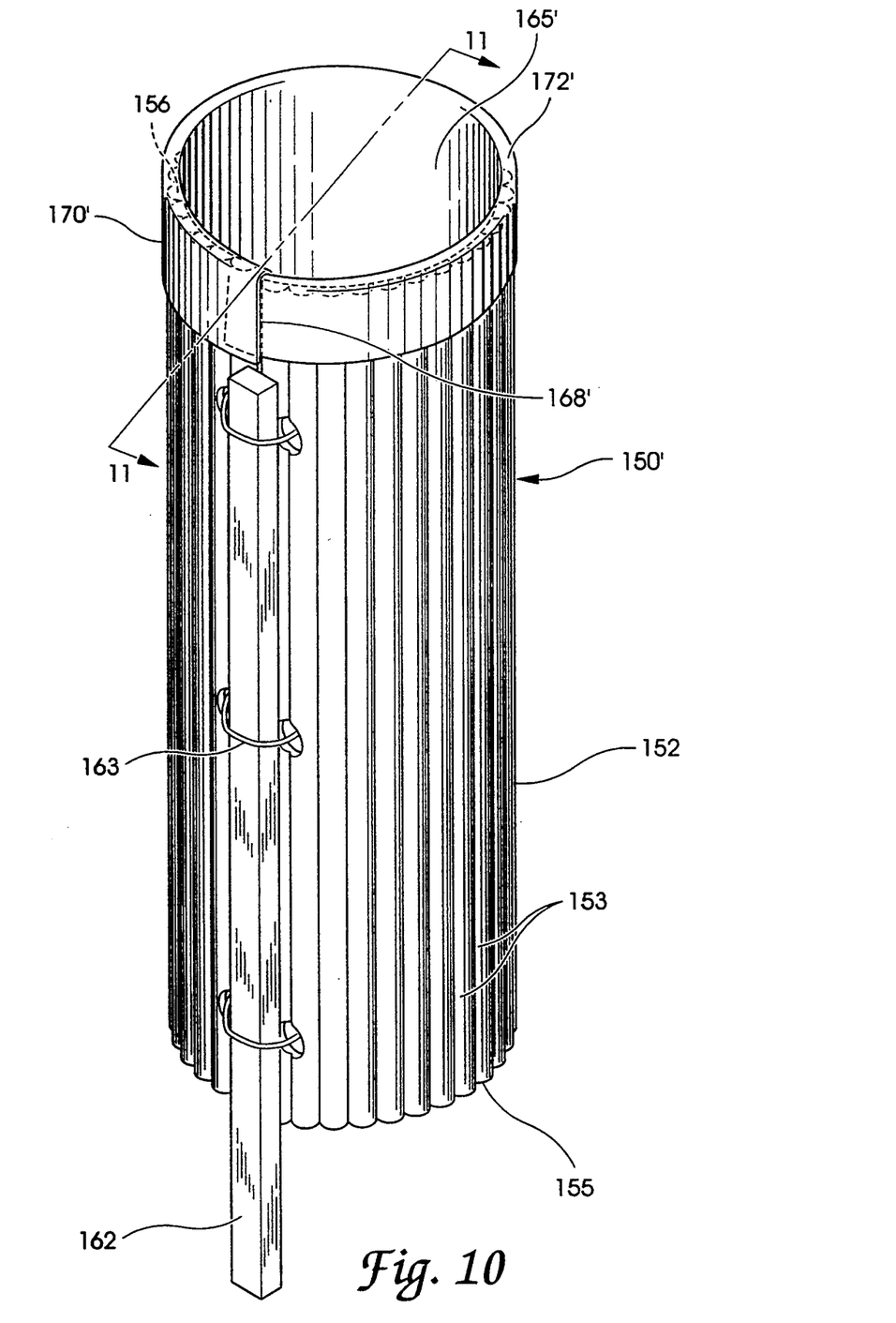
FIG. 10 is a side view of a modification to the embodiment of FIG. 9 shown with the inner liner folded over the top of the outer liner.

In a modification of the plant protector shown in FIG. 9, a plant protector 150' is depicted in FIG. 10. In this embodiment, the plant protector 150' is formed by an outer sheet 152 which is identical in all respects to the like numbered component in FIG. 9. The difference between the embodiment of FIG. 10 is that the top portion 170' is folded over the top edge 156 of the corrugated outer sheet 152. Specifically, the top portion 170' of the inner sheet 165' is folded at a fold portion 172' to overlap the top edge 156. This fold is shown in more detail in the cross-sectional view of FIG. 11. In this figure it can be seen that the overlapping side edges 167' and 168' of the inner sheet 165' are also folded over the top edge 156 of the outer sheet 152.

In assembling this particular version, the inner sheet 165 is laid over the outer sheet 152, both sheets lying flat. The apertures in the respective sheets are then aligned. Next, the inner sheet 165', and particularly the top portion 170', is folded over the top edge 156 of the outer sheet 152 to form a fold 172'. In this form, both sheets are then wrapped around into a cylindrical shape, such as the shape shown in FIG. 10. The stake 162 is then positioned adjacent the matching apertures and the flexible ties pass around the stake and through the apertures to completely secure the plant protector 150'.

Figure 11:
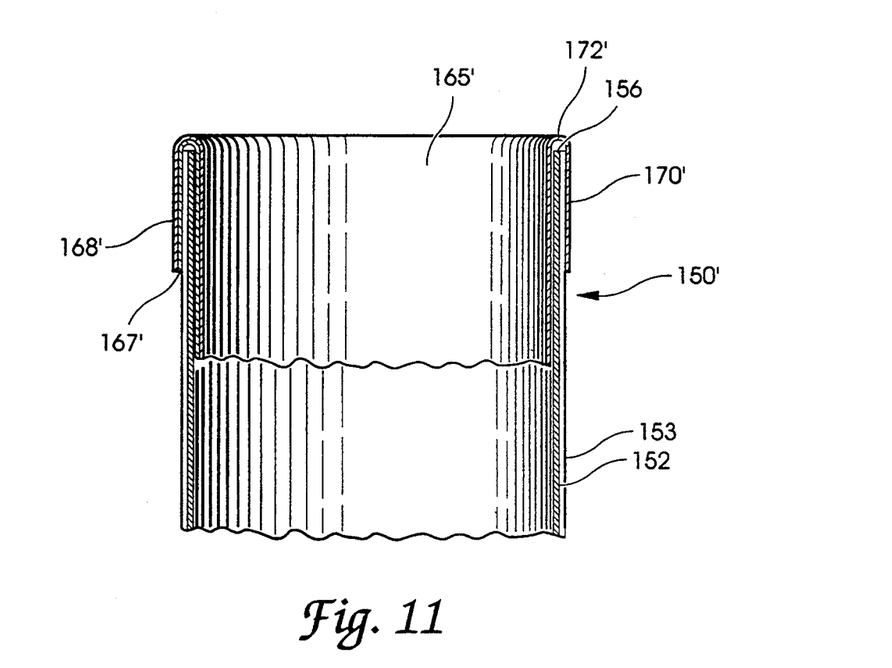
FIG. 11 is a partial cross-sectional view or the plant protector shown in FIG. 10, taken along lines 11—11 as viewed in the direction of the arrows.

It can be seen that the embodiment of FIGS. 9-11 add to the versatility of the plant protector 150 of this invention. In one instance, the inner sheet 165 can remain with its top portion 170 extending upright from the outer sheet 152. In another use, the top portion 170' is folded over the outer sheet. The top fold 172' of this latter embodiment provides a rounded surface that is gentler to the plant being protected by the apparatus. In addition, the fold 172' adds additional hoop stiffness at the upper edge of the tree protector 150' to prevent buckling of the apparatus. In the preferred embodiment, a separate inner sheet 165 is provided to overlay the outer sheet 152. Alternatively, the inner and outer sheets can be already laminated together, and the top portion 170 of the inner sheet formed by cutting off an upper portion of the corrugated outer sheet to expose the top portion 170 beneath.

Figure 12:
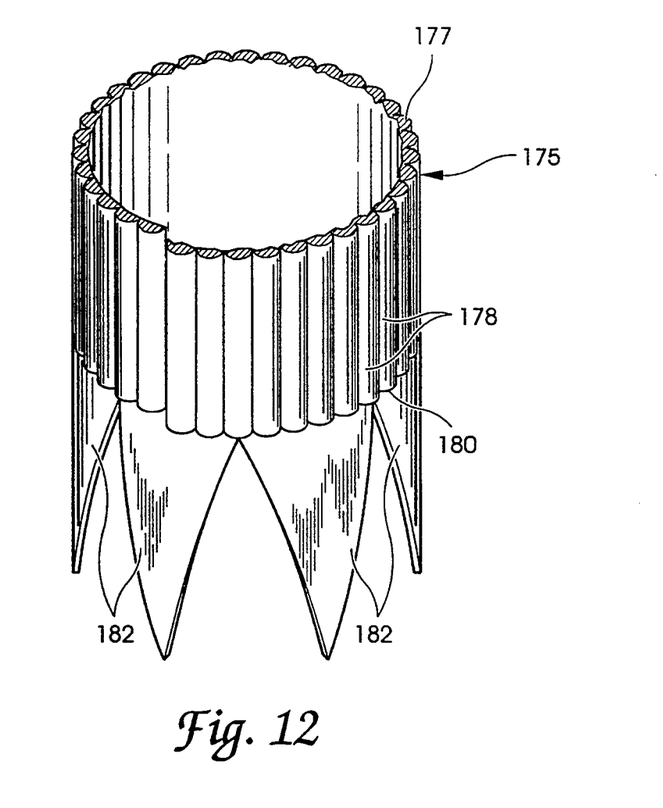
FIG. 12 is a partial side view of still another embodiment of the invention showing a spike formed at the bottom edge of the protector.

In a modification to each of the previously described embodiments, a plant protector 175, having an outer sheet 177 with corrugation grooves 178, can include spikes 182 extending from the bottom edge 180 of the sheet 177. These spikes are preferably 3-5 inches long per foot of out-of-ground length of the plant protector 175. That is, if the plant protector extends five feet out of the ground, the stakes 182 are preferably 15-25 inches long in order to firmly anchor the plant protector 175. In the preferred embodiment, the spikes 182 are cut from a single corrugated sheet. In this matter, the spikes 182 would at least initially include corrugation grooves 178. However, in order to add stiffness and facilitate introduction of the spikes into the ground, these corrugation grooves 178 are flattened at the spikes, thereby yielding thicker material at that portion of the plant protector 175. Alternatively, although less desirable, the outer sheet 177 can be formed so that the portion ultimately cut to form the spikes 182 is not formed with corrugation grooves 178. When using the spikes 182 of this modification, it is preferred that the spikes flare slightly outward away from the cylindrical plant protector 175 in order to provide a firm anchor for the plant protector into the ground.

Figure 13:
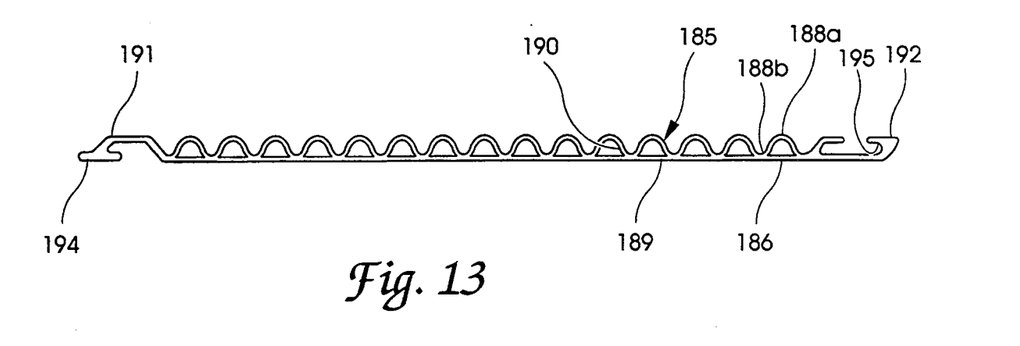
FIG. 13 is a top elevational view of a fully extruded plant protector according to one embodiment of the invention, shown prior to forming into a cylinder.
Figure 14:
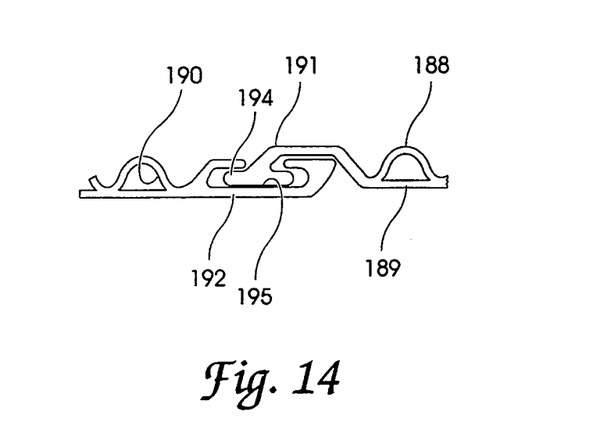
FIG. 14 is an enlarged view of the interlocking fastener of the plant protector shown in FIG. 13.

Yet another embodiment of the invention is shown in FIGS. 13 and 14. In this embodiment, the plant protector 185 is defined by a single extruded sheet 186. Specifically, the extruded sheet 186 is formed with corrugation ridges 188A and grooves 188B integral with an inner sheet 189. The corrugation ridges form a channel 190 between the ridges 188A and the inner sheet 189. Alternatively, the ridges 188A can be solid, that is no channel 190 defined between the corrugations and the inner sheet. However, it is preferred that the extruded sheet 186 include the channels 190 in the corrugations to reduce the weight without sacrificing any strength for the plant protector apparatus 185.

The extruded sheet 186 is also formed with a first fastener end 191 and an opposite second fastener end 192, both fasteners operating as a male-female interlocking fastener. The first fastener end defines a flanged tab 194 which fits within a correspondingly shaped recess 195 at the second fastener end 192. As shown in FIG. 14, when the extruded sheet 186 is wrapped into a cylinder, the flange tab 194 is received within the recess 195 to engage the respective ends of the sheet 186. It is understood that the plant protector 185 in accordance with this embodiment is extruded in a single longitudinal sheet so that the flanged tab 194 and recess 195 extend along the entire length of a side edge of the extruded sheet 186. With this embodiment, the flexible ties of the previous embodiments are not required to connect the opposite side edges of the extruded sheet 186. However, apertures may be provided to receive ties to engage a stake to the plant protector 195.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A plant protector apparatus comprising:
   a flexible sheet having a top edge, a bottom edge and two opposite side edges, said sheet having a top portion that is folded down onto itself at said top edge, said sheet further being formed into a cylinder with said opposite overlapping;
   a stake for supporting said cylindrical formed sheet on the ground; and
   means for attaching said stake to said flexible sheet when said sheet is in its cylindrical form wherein said flexible sheet includes an outer corrugated layer and an inner substantially smooth layer; and, further wherein said inner layer includes a portion extending a substantial distance beyond said outer layer, said portion being folded down over said outer layer at said top portion of said sheet.

2. The plant protector apparatus of claim 1, wherein said portion of said inner layer defines several flaps separated by longitudinal slits at said top portion.

3. The plant protector apparatus of claim 1, wherein said portion of said inner layer is continuous around the circumference of the cylindrical form of said sheet.

* * * * *